United States Patent
Smith et al.

(10) Patent No.: US 9,232,808 B2
(45) Date of Patent: Jan. 12, 2016

(54) PROCESSED CHEESE WITHOUT EMULSIFYING SALTS

(75) Inventors: Gary Francis Smith, Glenview, IL (US); Edwin Gerardo Rivera, Chicago, IL (US)

(73) Assignee: Kraft Foods Group Brands LLC, Northfield, IL (US)

(*) Notice: Subject to any disclaimer, the term of this patent is extended or adjusted under 35 U.S.C. 154(b) by 1969 days.

(21) Appl. No.: 12/143,990

(22) Filed: Jun. 23, 2008

(65) Prior Publication Data

US 2009/0092730 A1    Apr. 9, 2009

Related U.S. Application Data

(60) Provisional application No. 61/007,506, filed on Jun. 29, 2007.

(51) Int. Cl.
  *A23C 19/00* (2006.01)
  *A23C 19/08* (2006.01)

(52) U.S. Cl.
  CPC ........... *A23C 19/08* (2013.01); *A23C 2250/054* (2013.01)

(58) Field of Classification Search
  USPC ....................................................... 426/582
  See application file for complete search history.

(56) References Cited

U.S. PATENT DOCUMENTS

| | | | |
|---|---|---|---|
| 4,552,774 | A | 11/1985 | Gronfor |
| 5,064,660 | A | 11/1991 | Silver |
| 5,750,177 | A | 5/1998 | Yee et al. |
| 6,177,118 | B1 | 1/2001 | Blazey et al. |
| 6,372,268 | B1 | 4/2002 | Silver et al. |
| 6,440,481 | B1 | 8/2002 | Gascoigne et al. |
| 6,902,750 | B2 | 6/2005 | Eckert et al. |
| 7,157,108 | B2 | 1/2007 | Bhaskar et al. |
| 7,192,619 | B2 | 3/2007 | Dybing et al. |
| 2003/0054068 | A1 | 3/2003 | Dybing et al. |
| 2004/0208955 | A1 | 10/2004 | Carr et al. |
| 2004/0224069 | A1 | 11/2004 | Aird et al. |
| 2005/0196509 | A1 | 9/2005 | Murphy |
| 2005/0202134 | A1 | 9/2005 | Schroeder |
| 2005/0214431 | A1 | 9/2005 | Fitzsimons et al. |
| 2005/0238783 | A1 | 10/2005 | Han |
| 2006/0057248 | A1 | 3/2006 | Lincourt et al. |
| 2006/0159804 | A1 | 7/2006 | Bhaskar et al. |
| 2007/0082086 | A1 | 4/2007 | Carr et al. |
| 2008/0317928 | A1 | 12/2008 | Towler |
| 2009/0068311 | A1 | 3/2009 | Lucey et al. |

FOREIGN PATENT DOCUMENTS

| | | |
|---|---|---|
| EP | 0016292 A1 | 10/1980 |
| EP | 0535728 | 4/1993 |
| EP | 0627883 | 9/1993 |
| EP | 1527692 A1 | 5/2005 |
| GB | 2237178 A | 5/1991 |
| JP | 61158746 A | 7/1986 |
| JP | 62285755 | 12/1987 |
| JP | 62285755 A | 12/1987 |
| JP | 63024848 | 2/1988 |
| JP | 63129951 | 6/1988 |
| JP | 63129951 A | 6/1988 |
| JP | 01013948 A | 1/1989 |
| JP | 64013948 A | 1/1989 |
| JP | 01218548 A | 8/1989 |
| JP | 05276865 | 10/1993 |
| JP | 07143845 | 6/1995 |
| JP | 11221014 A | 8/1999 |
| JP | 11332462 A | 12/1999 |
| JP | 03259804 A | 9/2003 |
| JP | 2003259804 | 9/2003 |
| JP | 3894912 B2 | 3/2005 |
| WO | 9518539 A1 | 7/1995 |
| WO | 0027214 A1 | 5/2000 |
| WO | 0141578 | 6/2001 |
| WO | 0296208 | 5/2002 |
| WO | 03075668 | 9/2003 |
| WO | 03075668 A1 | 9/2003 |
| WO | 2004057971 | 7/2004 |
| WO | 2007026053 A1 | 3/2007 |
| WO | 2008026940 A1 | 3/2008 |
| WO | 2008122094 A1 | 10/2008 |

OTHER PUBLICATIONS

Burrington, Kimberlee. "Understanding Process Cheeses" Food Product Design. Feb. 1, 2000.*
Saunders, Terri L. "The Case for Raw Milk" Jan. 15, 2006 http://web.archive.org/web/20060115051108/http://www.sunherb.com/RawMilk.htm.*
EP Search Report—EP 08159303, Oct. 22, 2008.
Bowland, Rheological and Microstructural Analyses of Model Processed Cheese, A dissertation submitted to the Graduate Faculty of North Carolina State University, Food Science, 1997, pp. 45, 60, 61, 145, and 146.

* cited by examiner

Primary Examiner — D. Lawrence Tarazano
Assistant Examiner — Katherine D Leblanc
(74) Attorney, Agent, or Firm — Fitch, Even, Tabin & Flannery LLP

(57) ABSTRACT

The present invention is directed to process cheese type products prepared with calcium-reduced ingredients but without emulsifying salts and methods of producing such process cheese type products without emulsifying salts. The process cheeses of the present invention are advantageously resistant to separation during heating and retain desirable organoleptic properties, such as texture, without using emulsifying salts. The process cheeses of the present invention are also lower in sodium than conventional produces cheese products.

25 Claims, No Drawings

PROCESSED CHEESE WITHOUT EMULSIFYING SALTS

RELATED APPLICATION

This application is based on, and claims benefit of, U.S. Provisional Application Ser. No. 61/007,506 with an effective date of Jun. 29, 2007, as well as U.S. patent application Ser. No. 11/771,225, filed on Jun. 29, 2007, which was requested to be converted to the Provisional Application Ser. No. 61/007,506 on Jun. 19, 2008, under 35 U.S.C. §153(b)(2), all of which applications are hereby incorporated by reference.

FIELD OF THE INVENTION

The present invention is directed to process cheese prepared without significant levels of emulsifying salts and methods of producing such process cheese without significant levels of emulsifying salts. The cheese of the present invention is advantageously resistant to separation during and after heating and retains desirable organoleptic properties, such as texture, without the use of emulsifying salts.

BACKGROUND OF THE INVENTION

In the early 1900's, James L. Kraft patented a method of making process cheese which had distinct technical advantages over natural cheese. Namely, process cheese has an extended shelf-life in comparison to natural cheese, is resistant to separation when cooked, and can be formed into a wide variety of product forms (e.g., slices, loaves, sauces, dips, and the like). Process cheese is produced by comminuting and mixing together natural cheese, other dairy ingredients, emulsifiers, salt, and optionally food colorings. Various types of natural cheese as well as blends thereof may be used to provide consumer preferred flavor profiles. Pasteurized process cheese is heated to at least 150° F. for at least 30 seconds.

Despite the technical advantages over natural cheese, it would be desirable to provide process cheeses having improved attributes which would appeal to larger numbers of consumers. For example, some consumers may perceive the emulsifying salts as "chemicals" and prefer products containing more natural ingredients. Emulsifying salts also tend to modify the desired flavor of the natural cheeses by providing a milder and saltier flavor profile; some consumers may prefer a more natural and intense cheese flavor profile in a process cheese. In addition, processed cheese generally contains higher levels of sodium than natural cheese since processed cheese contains sodium based emulsifying salts as well as sodium chloride.

Process cheese is prepared by blending cheese, emulsifying salts, and other ingredients under conditions of heat and shear. Emulsifying salts are useful for creating a cheese that melts smoothly when cooked, as opposed to separating into different phases. The most common emulsifying salts are sodium and potassium citrates, monophosphates, and polyphosphates. Emulsifying salts complex with calcium ions in the cheese to solubilize the protein, increase protein hydration and swelling, to facilitate emulsification of fat, and to adjust and stabilize pH. Emulsifying salts reduce the tendency for fat globules in the cheese to coalesce and pool on the surface of the molten cheese. Emulsifying salts allow a cheesemaker to pasteurize the cheese product without deterioration of the cheese texture.

Prior attempts to produce a process cheese without emulsifying salts have generally been problematic. For example, European Patent Application 0016292 provides a process for preparing process cheese wherein ion exchange is effected using an ion exchange column; this approach is extremely cumbersome in manufacturing practice and would be extremely costly in terms of capital equipment and operating costs. "Pasteurized blended cheese" (as defined in 21 C.F.R. 133.167) identifies a good tasting smooth pasteurized cheese product without emulsifying salts. Manufacturers do not, however, generally offer such "pasteurized blended cheese" products because of high cost (i.e., generally requires over 90% natural cheese) and its lack of manufacturing robustness (i.e., the emulsion easily separates or breaks at temperatures above 157° F., making it difficult to pasteurize on a consistent basis). European Patent Application 0535728 also provides a method of heating an unpasteurized cheese blend comprising 30 to 90 percent unripened cheese and a protein source to 35 to 65° C. (i.e., approximately 95 to 149° F.). Since the heating step is carried out below pasteurization temperatures, the resulting cheese is not pasteurized.

Thus, although process cheese has a number of beneficial qualities there is a desire to produce a cheese product that maintains beneficial qualities including extended shelf-life and resistance to separation during heating, but without the addition of certain additives, such as emulsifying salts. There is an additional desire to decrease the amount of added sodium in process cheese and further, to improve the quality of the natural cheese flavor in the product at a modest cost.

SUMMARY OF THE INVENTION

Described herein is a process cheese-type product comprising natural cheese and a calcium reduced casein source, wherein the process cheese-type product does not contain significant levels of emulsifying salts. Generally, the process cheese-type product contains natural cheese with about 2.5 to 25 percent (solid basis) calcium reduced casein source. Generally the process cheese-type products of this invention will have an overall moisture level of about 35 to 60 percent. Preferably, the cheese product comprises natural cheese in the range of about 20 to about 87 percent, a source of whey protein in the range of about 0 to about 20 percent (solid basis), and a calcium reduced casein source in the range of about 0.8 to about 25 percent (solid basis). More preferably, the cheese product comprises natural cheese in the range of about 20 to about 60 percent, a source of whey protein in the range of about 0 to about 15 percent (solid basis), and a calcium reduced casein source in the range of about 2.5 to about 20 percent (solid basis). Even more preferably, the cheese product comprises natural cheese in the range of about 30 to about 50 percent, a source of whey protein in the range of about 0 to about 15 percent (solid basis), and a calcium reduced casein source in the range of about 5 to about 20 percent (solid basis). The relative amounts of natural cheese and water will vary depending on the type of cheese product desired. For example, cheese slice-type products will generally have higher levels of natural cheese and lower moisture contents as compared to cheese spread-type products (generally, lower levels of natural cheese and higher levels of moisture). For purposes of this invention, "significant levels" of emulsifying salts are generally above about 0.5 percent. Thus, the cheese products of the present invention contain less than about 0.5 percent emulsifying salts, preferably less than about 0.2 percent emulsifying salts, and more preferably no added emulsifying salts.

For purposes of this invention, the calcium reduced casein source should have less than about 350 ppm calcium per percent casein, preferably less than about 200 ppm calcium per percent casein, and more preferably less than about 175 ppm calcium per percent casein. The calcium reduced casein source may range from a liquid to a powder. For example, one commercially available calcium reduced casein source is Nutrilac CH-7813 from Arla Foods (a powder which contains about 61.5 percent casein and has a calcium level of about 10,400 ppm); it contains about 170 ppm calcium per percent casein. Calcium reduced liquids such as prepared in Example 3 can also be used. This calcium reduced skim milk liquid has a moisture level of about 82.8 percent, a casein level of about 10.4 percent, and a calcium level about 1,440 ppm. Thus, it contains about 139 ppm calcium per percent casein.

Generally, the process cheese products of this invention have less than about 325 mg sodium/oz, preferably less than about 270 mg sodium/oz, and more preferably less than about 240 mg sodium/oz, while maintaining perceived saltiness at levels normally associated with process cheese.

In one embodiment, the cheese product can be heated up to 160° F. to form a homogenous blend without substantial separation. In another embodiment, the cheese product can be heated up to 190° F. to form a homogenous blend without substantial separation. In yet another embodiment, the cheese product is pasteurized.

Other than significant levels of emulsifying salts, the cheese product described herein may contain additional ingredients so long as they do not adversely affect the properties of the resulting process cheese. Examples of such additives include, but are not limited to colorants, flavorants, preservatives, other milk components, and the like. For example, in one embodiment, the cheese product may contain milk fat in levels up to about 15 percent to achieve the desired fat targets in the finished product. In another embodiment, the cheese product contains added sodium chloride. In yet another embodiment, the cheese product contains sorbic acid.

In one embodiment, the cheese product described herein may be any of a cheese dip, a cheese spread, a cheese block, a cheese slice, a shredded cheese, or the like.

In one embodiment, the calcium reduced casein source contained in the cheese described herein may be produced using ultrafiltration, diafiltration, cation exchange, acidification, dialysis, chelation, as well as similar techniques and combinations thereof. One preferred calcium reduced casein source can be obtained using ultrafiltration alone or in combination with diafiltration.

Also described herein is a cheese product comprising natural cheese in the range of about 20 to about 87 percent, a source of whey protein in the range of about 0 to about 20 percent (solid basis), a calcium reduced casein source in the range of about 0.8 to about 25 percent (solid basis), and overall moisture in the range of about 35 to 70 wherein the cheese product can be heated to 160° F. without substantial separation. Overall moisture is the moisture content of the final cheese product and includes moisture added via the individual ingredients as well as any water added to the composition (either directly or as condensate).

Also described herein is a method of making a cheese product comprising blending together (1) natural cheese in the range of about 20 to 87 percent, (2) a source of whey protein in the range of about 0 to about 20 percent (solid basis), and (3) a calcium reduced casein source in the range of about 0.8 to about 25 percent (solid basis) to form a mixture; cooking the mixture in a process cheese cooker to a temperature of at least about 160° F., wherein the cheese product does not contain emulsifying salts.

Also described herein is a method of making a cheese product comprising blending together (1) natural cheese in the range of about 20 to 87 percent, (2) a source of whey protein in the range of about 0 to about 20 percent (solid basis), and (3) a calcium reduced casein source in the range of about 0.8 to about 25 percent (solid basis) to form a mixture; heating the mixture in a process cheese cooker to a temperature of at least 160° F. for a time sufficient to provide a homogenous mixture as the cheese product, wherein the cheese product can be heated to 160° F. without separation.

DETAILED DESCRIPTION OF THE INVENTION

The present invention addresses the need for a process cheese that is resistant to separation during heating and retains desirable organoleptic properties, such as smooth texture, more intense cheese flavor, and reduced sodium levels (relative to conventional process cheese) without the use of conventional emulsifying salts.

There are numerous advantages to the present invention. For example, the process described herein yields cheese products having desirable organoleptic properties such as good meltability, smooth texture, and a wide spectrum of possible cheese flavors, including natural cheese flavors, which has been unattainable by prior methods of making process cheese without the addition of emulsifying salts or only with excessive costs. The cheese products of the present invention are more natural than the process cheeses of the prior art because they may be produced without the addition of emulsifiers, which are necessary to prevent separation during heating in traditional processed cheese products. Furthermore, the cheese products described herein are resistant to separation at typical process cheese shear rates and process cheese manufacturing temperatures. The cheese products of the present invention are more healthy than the process cheese of the prior art since they have reduced sodium content with the same perceived saltiness as traditional process cheese.

Generally, the pasteurized process cheese of the present invention may be produced by blending together natural cheese or mixture of natural cheeses (preferably ground using a conventional cheese grinder), moisture, and a calcium reduced casein source. Sodium chloride may be added for flavor. Sorbic acid may be added as an anti-microbial agent. Other optional ingredients may be added to improve texture, flavor, nutrition, and/or cost attributes. These include, but are not limited to, whey derived ingredients (e.g., whey protein concentrate), non-fat dry milk, milk protein concentrate, anhydrous milk fat, gums, starches, gelatin, and the like. Emulsifying salts are not added to the blend. Next, the ingredients are blended together and then heated to pasteurization temperatures. Optionally, shear may be applied during or after the heating. The resulting cheese product is generally homogenous, shows no signs of separation (i.e., "watering off" and/or protein sedimentation) at pasteurization temperatures, and has significantly lower sodium content than typical process cheese (but with the same perceived saltiness by taste). Typically, the process cheeses of this invention have less than about 180 mg sodium as compared to about 270 mg sodium per 0.75 oz serving for conventional process cheeses prepared using emulsifying salts; thus, the sodium reduction provided by the present invention is about 30 percent or more as compared to conventional process cheeses (some of which may have even higher levels of sodium due to higher emulsifying salt usage). The cheeses of this invention can also have a stronger aged cheese flavor than typical process cheeses prepared using emulsifying salts; in other words, the process cheeses of this invention will more closely approach the flavor profile of the natural cheeses from which they are prepared as compared to similar, but conventionally prepared, process cheeses prepared using emulsifying salts which are currently available. The shelf lives of the cheeses of this invention appear to be similar to that of conventional process cheeses prepared with emulsifying salts.

In one embodiment, the cheese product of the present invention comprises a natural cheese or a blend of natural cheese in the range of about 20 to about 87 percent (preferably ground using a conventional cheese grinder), a source of whey protein in the range of about 0 to 20 percent (solid basis), anhydrous milk fat in the range of 0 to about 15 percent, a calcium reduced casein source in the range of 0.8 to 20 percent (solid basis), overall moisture in the range of 35 to about 70 percent, sorbic acid in the range of 0 to about 0.20 percent, and added sodium chloride in the range of 0 to about 1.7 percent. In another embodiment, the cheese product of the present invention comprises a natural cheese or a blend of natural cheese in the range of about 40 to about 60 percent, a source of whey protein in the range of about 5 to 20 percent (solid basis), anhydrous milk fat in the range of about 5 to about 15 percent, a calcium reduced casein source in the range of 3 to 15 percent (solid basis), overall moisture in the range of 40 to about 55 percent, sorbic acid in the range of 0.10 to about 0.20 percent, and added sodium chloride in the range of 0.25 to about 1.5 percent.

As is known by one of ordinary skill in the art, the ingredients may be used in varying amounts depending on the desired outcome of the cheese product. For example, for a reduced sodium cheese product, a cheesemaker may include a small amount or no salt in the cheese blend.

Natural cheese refers to unpasteurized cheese made by curdling milk using some combination of rennet (or rennet substitutes) and acidification. The natural cheese used in the present invention may be freshly made or aged.

Whey protein refers to a collection of globular proteins that can be isolated from whey, which is the liquid remaining after milk has been curdled and strained. Whey protein is typically a mixture of beta-lactoglobulin, alpha-lactalbumin, and serum albumin proteins. In one embodiment, whey protein concentrate (WPC) may be used as the whey protein source. WPC is derived from whey by conventional concentration techniques. The whey protein source may also include lactose, vitamins, minerals, and fat.

Moisture may be added to the blend by any method, such as, but not limited to, injecting steam into the cooker (e.g., a laydown cooker), comingling of condensed steam from cooking, and/or direct addition of water. Of course, moisture can also enter into the system through the various ingredients (e.g., moisture from the natural cheese). Overall moisture of the final cheese products includes all moisture independent of how the moisture was introduced into the final product.

Casein is the general name for the dominant class of proteins present in milk, and is essentially the protein left in cheese after the whey (including the whey protein) has been drained off. Most types of casein have calcium phosphate groups. The higher the level of calcium, the less soluble the casein. One of the most important functions of process cheese emulsifying salts is to bind the calcium, increasing the solubility of the casein and enabling the casein to emulsify the blend. While not wishing to be limited by theory, it is thought that at least in part, the calcium reduced casein source which has a high solubility, compensates for the low solubility in the conventionally made natural cheese so that when the two are blended, mixed, and heated, the resulting blend has sufficient solubility at a microscopic level for a stable emulsion. The finished product is sufficiently soluble as to resemble process cheese in terms of smoothness and homogeneity in the cooking process and finished product. Further steps such as homogenization tend to create even better mixing at a microscopic level, and result in enhanced smoothness, creaminess, and stability of the emulsion.

The calcium reduced casein used in the present invention may be produced by any known means. Methods for producing calcium reduced casein are described in U.S. Patent Publication No. 2003/0054068 of Dybing et al. and WO 01/041578 of Bhaskar, both of which are hereby incorporated by reference. Preferably the calcium reduced casein used in this invention is produced by ultrafiltration alone or in combination with diafiltration. Commercially available calcium reduced casein (e.g., Nutrilac CH-7813 from Aria Foods) may also be used.

Dybing et al. provides a calcium reduced milk protein concentrate produced by running the milk protein concentrate through a cation exchanger containing monovalent cations. The divalent calcium ions are exchanged for monovalent cations, such as hydrogen, potassium, or sodium.

Bhaskar provides a calcium reduced milk protein concentrate produced by use of a cation exchanger, acidification and dialysis, or chelation. In those embodiments in which calcium removal is by acidification and subsequent dialysis, ultrafiltration, or diafiltration, the pH of the milk protein concentrate is adjusted to be in the range of 4.8 to 5.5 and passed through a membrane having a nominal molecular weight cut off of 10,000 Daltons or less. When the calcium removal is by way of addition of a chelating agent, preferred chelating agents for use include citric acid, ethylenediaminetetraacetic acid (EDTA), food phosphates/polyphosphates, food acidulants, tartaric acid, citrates and tartrates.

EXAMPLES

A better understanding of the present embodiment and its many advantages may be clarified with the following examples, given by way of illustration.

Example 1

A cheese product was produced by blending together 36.2 percent natural cheddar cheese (moderately aged), 30.6 percent added water (including condensed steam from injecting steam into a batch cooker), 14.9 percent WPC34 (whey protein concentrate with about 34 percent protein used as filler), 9.0 percent calcium reduced milk protein concentrate (Nutrilac CH-7813 from Aria Foods; powder containing about 61.5 percent casein and about 10,400 ppm calcium; 169 ppm calcium per percent casein), 8.6 percent anhydrous milk fat, 0.5 percent salt, and 0.17 percent sorbic acid. No emulsifying salts were added. After the ingredients were blended together, the blend was heated to 165° F. over about 5 minutes using injected steam in a laydown cooker; a first sample was taken. Next, the blend was heated to 190° F. over about 3 minutes by further injection of steam; a second sample was taken. The overall moisture content was about 44 percent.

Both the first and second samples were homogenous and showed no signs of separation. They were firm in texture, similar to a process loaf product. Organoleptically, the products were creamy and smooth with a strong cheddar flavor (generally much more intense in cheese flavor than conventional process cheese with the same basic composition). Additionally, the samples had significantly lower sodium content (about 163 mg sodium/ounce) than typical process cheese; this represents about a 60 percent reduction in sodium as compared to conventional process cheese. When these samples are remelted, they flowed evenly and had a smooth consistency. Under refrigeration conditions, these samples had shelf lives of at least 9 months.

Example 2

A cheese product was produced by blending together 28.4 percent aged natural cheddar cheese, 39.5 percent added water (including condensed steam from injecting steam into a batch cooker), 14.9 percent WPC34, 5.0 percent calcium reduced milk protein concentrate (Nutrilac CH-7813 from Arla Foods), 11.4 percent anhydrous milk fat, 0.7 percent salt, and 0.17 percent sorbic acid. No emulsifying salts were added. After the ingredients were blended together, the blend was heated to 165° F. over about 5 minutes in a batch style steam injection cooker and a first sample was taken. Next, the blend was heated to 181° F. over about 3 minutes with further steam injection and a second sample was taken.

Both first and second samples were homogeneous and smooth, had a strong cheese flavor, and were soft and dippable in texture. Both samples were low in sodium (about 163 mg sodium/ounce) and had similar shelf lives as the products from Example 1. Overall moisture content was about 50 percent.

Example 3

A calcium reduced skim milk preparation was produced using pasteurized cow skim milk (pH adjusted from 6.6 to 5.5 using food grade 5N HCl). The resulting milk was then concentrated using ultrafiltration and diafiltration to about 3 times the original concentration. The dilfiltration water used was also acidified to approximately pH 5.35. The resulting concentrated skim milk had a reduced calcium level (about 170 ppm calcium per percent casein) with about 82.8 percent moisture, about 10.4 percent casein, about 2.4 percent lactose, and about 1820 ppm calcium.

A cheese blend was prepared with 40 parts calcium reduced condensed skim milk, 41 parts aged cheddar cheese, 8.25 parts anhydrous milk fat, 1.35 parts sodium chloride, and 0.4 parts added water. The blend was mixed in a standard ribbon blender for about 12 minutes. The blend was then heated in a laydown process cheese cooker to 175° F. using steam injection; about 9 additional parts of water were added due to steam condensation. Then the product was homogenized in a two stage homogenizer (about 2500 psi total/500 psi second stage). The finished product contained about 56.7 percent overall moisture, about 22.9 percent fat, and about 2.2 percent sodium chloride.

The product was extremely creamy and smooth, had a strong cheddar cheese flavor and was white in color. The product was soft like a dip, and could be cleanly cut with a spoon. The product had a sodium level of about 237 mg per ounce of product, which is about 46 percent lower than the sodium level of a typical process cheese dip product. When the product was later re-melted, it flowed but remained emulsified and smooth. The homogenized product was smoother, creamier, firmer, and whiter than the unhomogenized product.

Example 4

A blend was prepared with 25 parts aged natural cheddar cheese, 24.9 parts 1.5 month old cheddar cheese, 25 parts calcium reduced condensed skim milk as prepared in Example 3, 5 parts calcium reduced milk protein concentrate (Nutrilac CH-7813), 3 parts whey protein concentrate (34 percent protein), 6.3 parts anhydrous milkfat, 1.15 parts sodium chloride, 0.25 parts xanthan gum, 0.25 parts locust bean gum, and 0.17 parts sorbic acid. These ingredients were blended together in a standard ribbon blender for approximately 12 minutes, then cooked in a standard process cheese laydown cooker to 175° F. as in Example 3; approximately 6 to 9 percent water was added as steam condensate in the cooker. A first sample was directly packaged in a hotpack slice format. A second sample was homogenized in two stage homogenizer (about 2500 psi total/500 psi second stage) and then packaged in a hotpack slice format. The final product has an overall moisture content of about 47 percent.

The first sample (i.e., unhomogenized sliced sample) was homogeneous, firm, and smooth. It separated easily from wrappers used to keep slices separated. It had a slight yellow hue. Protein had aligned in the direction of flow so that the slice had an almost string cheese like tear in the direction of original flow into the wrapper, but resisted tear in the transverse direction. Product had a strong cheese flavor and was low in sodium (about 237 mg/ounce of product). The second sample (i.e., homogenized product) was whiter in appearance, had excellent cheese flavor, and peeled extremely well from the wrappers. There was less protein alignment and the product tears equally well in either direction.

Example 5

Using essentially the same procedure as described in Example 4 above, cheese products containing high levels of natural cheese (i.e., about 75 to about 87 percent) were prepared using the following formulations:

Sample 1

| | |
|---|---|
| Cheddar (mild) | 38% |
| Cheddar (aged) | 40% |
| Cream Cheese | 9% |
| Nutrilac CH-7813 | 2% |
| Salt | 0.7% |
| Sorbic Acid | 0.2% |
| Added Water (including steam condensate) | 10% |

Sample 2

| | |
|---|---|
| Cheddar (sharp, 2% milk) | 27% |
| Cheddar (mild, low fat)) | 35% |
| Cheddar (aged, full fat) | 21% |
| Nutrilac CH-7813 | 1% |
| Salt | 0.7% |
| Sorbic Acid | 0.2% |
| Added Water (including steam condensate) | 15% |

Sample 1 contained about 87 percent conventionally prepared natural cheese; Sample 2 contained about 83 percent conventionally prepared natural cheese. Both samples produced cheese products in the form of blocks which were sufficiently firm to be suitable for slicing; products were slightly elastic and had good cheddar flavor, similar to conventionally made cheddar cheese. Total moisture was about 43 and 50 percent, respectively, for Samples 1 and 2.

All references (including publications, patents, patent publications, and patent applications) cited herein are incorporated by reference. All percentages throughout this specification are by weight percent unless otherwise specified.

What is claimed is:
1. A process cheese product comprising:
about 20 to about 87 percent natural cheese or a mixture of natural cheeses obtained from curdled milk and one of rennet, rennet substitutes, acidification, and combina- tions thereof, the natural cheese or the mixture of natural cheeses providing an amount of non-calcium reduced casein;

about 0.8 to about 25 percent (solid basis) of a calcium reduced casein source providing an amount of calcium reduced casein having calcium but not more than about 350 ppm calcium per percent of casein;

a total amount of casein provided from the non-calcium reduced casein in the natural cheese or a mixture of natural cheeses and the calcium reduced casein in the calcium reduced casein source;

wherein the process cheese product contains less than about 350 mg sodium per ounce;

wherein the total amount of casein includes more of the casein from the non-calcium reduced casein than the casein from the calcium reduced casein;

wherein the process cheese product is homogenous; and wherein the process cheese product does not contain significant levels of emulsifying salts.

2. The process cheese product of claim 1, wherein the process cheese product contains about 30 to about 50 percent natural cheese or mixture of natural cheeses, and about 5 to about 20 percent calcium reduced casein source (solid basis).

3. The process cheese product of claim 1, wherein the process cheese product contains about 20 to about 60 percent natural cheese or mixture of natural cheeses, and about 2.5 to about 20 percent calcium reduced casein source (solid basis).

4. The process cheese product of claim 1, wherein the process cheese product can be heated up to 160° F. without substantial separation.

5. The process cheese product of claim 2, wherein the process cheese product can be heated up to 190° F. without substantial separation.

6. The process cheese product of claim 1, wherein the process cheese product is pasteurized.

7. The process cheese product of claim 1 further comprising at least one ingredient from the group comprising anhydrous milk fat, whey protein, sodium chloride, and sorbic acid.

8. The process cheese product of claim 1, wherein the process cheese product is any of the group consisting of a cheese dip, a cheese spread, a cheese block, a cheese slice, and a shredded cheese.

9. The process cheese product of claim 1, wherein the calcium reduced casein source is produced by a process selected from the group consisting of ultrafiltration, diafiltration, cation exchange, acidification, dialysis, and chelation.

10. A process cheese product comprising:

about 20 to about 87 percent natural cheese or a mixture of natural cheeses obtained from curdled milk and one of rennet, rennet substitutes, acidification, and combinations thereof, the natural cheese or the mixture of natural cheeses providing an amount of non-calcium reduced casein;

a source of whey protein in the range of 0 to about 20 percent (solid basis);

about 0.8 to about 25 percent (solid basis) of a calcium reduced casein source providing an amount of calcium-reduced casein having calcium but not more than about 350 ppm calcium per percent of casein;

a total amount of casein provided from the non-calcium reduced casein in the natural cheese or a mixture of natural cheeses and the calcium reduced casein in the calcium reduced casein source;

wherein the process cheese product contains less than about 350 mg sodium per ounce;

wherein the total amount of casein includes more of the casein from the non-calcium reduced casein than the casein from the calcium reduced casein;

wherein the process cheese product is homogenous;

wherein the process cheese product can be heated to 160° F. without substantial separation;

and wherein the process cheese product does not contain significant levels of emulsifying salts.

11. The process cheese product of claim 10, wherein the process cheese product can be heated to 190° F. without substantial separation.

12. The process cheese product of claim 10, wherein the process cheese product is pasteurized.

13. The process cheese product of claim 10 further comprising at least one ingredient from the group comprising anhydrous milk fat, sodium chloride, and sorbic acid.

14. The process cheese product of claim 10, wherein the process cheese product is any of the group consisting of a cheese dip, a cheese spread, a cheese block, a cheese slice, and a shredded cheese.

15. The process cheese product of claim 10, wherein the calcium reduced casein source is produced by a process selected from the group consisting of ultrafiltration, diafiltration, cation exchange, acidification, dialysis, and chelation.

16. The process cheese product of claim 10, wherein the process cheese product contains about 30 to about 60 percent natural cheese or mixture of natural cheeses, about 5 to about 15 percent (solid basis) whey protein source, and about 2.5 to about 20 percent (solid basis) calcium reduced casein source.

17. The process cheese product of claim 1, wherein the calcium reduced casein has less than about 200 ppm of calcium per percent of casein.

18. The process cheese product of claim 1, wherein the calcium reduced casein has less than about 175 ppm of calcium per percent of casein.

19. The process cheese product of claim 1, wherein the process cheese product contains about 0.8 to about 9% (solid basis) calcium reduced casein source.

20. The process cheese product of claim 10, wherein the process cheese product contains about 0.8 to about 9% (solid basis) calcium reduced casein source.

21. The process cheese product of claim 1, wherein the natural cheese provides only casein that is non-calcium reduced.

22. The process cheese product of claim 1, wherein the process cheese product contains less than about 0.5% added emulsifiers.

23. The process cheese product of claim 22, wherein the process cheese product contains about 0.8 to about 9% (solid basis) calcium reduced casein source.

24. The process cheese product of claim 10, wherein the process cheese product contains less than about 0.5% emulsifying salts.

25. The process cheese product of claim 24, wherein the process cheese product contains about 0.8 to about 9% (solid basis) calcium reduced casein source.

* * * * *